United States Patent
Gangadharan

(10) Patent No.: US 7,444,405 B2
(45) Date of Patent: Oct. 28, 2008

(54) METHOD AND APPARATUS FOR IMPLEMENTING A MAC ADDRESS POOL FOR ASSIGNMENT TO A VIRTUAL INTERFACE AGGREGATE

(75) Inventor: SushilKumar Gangadharan, Santa Clara, CA (US)

(73) Assignee: Network Appliance, Inc., Sunnyvale, CA (US)

(*) Notice: Subject to any disclaimer, the term of this patent is extended or adjusted under 35 U.S.C. 154(b) by 641 days.

(21) Appl. No.: 11/085,504

(22) Filed: Mar. 21, 2005

(65) Prior Publication Data

US 2005/0163123 A1 Jul. 28, 2005

Related U.S. Application Data

(63) Continuation of application No. 09/888,778, filed on Jun. 25, 2001, now Pat. No. 6,928,478.

(51) Int. Cl.
G06F 15/173 (2006.01)

(52) U.S. Cl. ............. 709/226; 709/203; 709/225; 709/245; 709/250; 370/391; 370/475

(58) Field of Classification Search ......... 709/200–203, 709/225–228, 245, 249–250; 370/389–393, 370/401, 475
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,931,918 A | 8/1999 | Row et al. | |
| 5,941,972 A | 8/1999 | Hoese et al. | |
| 6,065,037 A | 5/2000 | Hitz et al. | |
| 6,425,035 B2 | 7/2002 | Hoese et al. | |
| 6,427,170 B1 * | 7/2002 | Sitaraman et al. | 709/226 |
| 6,434,627 B1 * | 8/2002 | Millet et al. | 709/245 |
| 6,496,511 B1 * | 12/2002 | Wang et al. | 709/226 |
| 6,510,154 B1 * | 1/2003 | Mayes et al. | 709/245 |
| 6,603,758 B1 * | 8/2003 | Schmuelling et al. | 709/226 |
| 6,678,743 B1 * | 1/2004 | Glass et al. | 709/201 |
| 6,738,382 B1 * | 5/2004 | West et al. | 370/475 |
| 6,801,949 B1 * | 10/2004 | Bruck et al. | 709/232 |
| 6,928,478 B1 * | 8/2005 | Gangadharan | 709/226 |

OTHER PUBLICATIONS

U.S. Appl. No. 09/888,677, filed Jun. 25, 2001, S. Gangadharan.
IEEE Standard for Carrier Sense Multiple Access with Collision Detection (CSMA/CD) Access Method and Physical Layer of Specifications; Aggregation of Multiple Link Segments. Amendment to IEEE Std 802.3, 1998 Edition.

* cited by examiner

Primary Examiner—Bharat N Barot
(74) Attorney, Agent, or Firm—Cesari and McKenna LLP

(57) ABSTRACT

A method to implement an address pool is described. The method collects at least one address, the at least one address originally assigned as a unique address to at least one physical interface of a computer. Each originally assigned address is modified to be a plurality of modified addresses. The plurality of modified addresses is organized as an address pool. A selected modified address from the pool is assigned as a unique address for the pool. The selected modified address is used in contacting the computer in response to receiving a message addressed to an address of the pool.

22 Claims, 4 Drawing Sheets

METHOD AND APPARATUS FOR IMPLEMENTING A MAC ADDRESS POOL FOR ASSIGNMENT TO A VIRTUAL INTERFACE AGGREGATE

This Application for United States Patent is a continuation of U.S. patent application Ser. No. 09/888,778 filed on Jun. 25, 2001, now issued as U.S. Pat. No. 6,928,478 on Aug. 9, 2005.

FIELD OF THE INVENTION

The present invention relates to aggregation of physical links in a computer network and, more specifically, to a method and apparatus for configuring the aggregated physical links with a network address.

BACKGROUND OF THE INVENTION

Data communication in a computer network involves the exchange of data traffic between two or more entities interconnected by communication links. These entities are typically software programs executing on hardware computer platforms which, depending on their roles within the network, may serve as end nodes or intermediate network nodes. Examples of end nodes may include client and server computers coupled to the communication links, whereas the intermediate nodes may include routers and network switches that interconnect those links. The communication links may comprise a shared local area network (LAN) or point-to-point medium, an example of which is an Ethernet medium.

A server is a special-purpose computer configured to provide specific services; when operating according to a client/server model of information delivery, the server may be configured to allow many clients to access its services. Each client may request those services by issuing protocol messages (in the form of packets) to the server over the communication medium. The server then responds to the client request by returning the requested services in the form of packets transported over the medium. The server may further include a plurality of ports or physical interfaces coupled to the communication links, wherein each interface is assigned at least one Internet protocol (IP) address and one media access control (MAC) address. In the case of a physical interface coupled to an Ethernet medium, the interface is assigned an original and unique 48-bit MAC address defined by IEEE Standard 802.3.

A virtual interface or aggregate comprises an aggregation of the physical interfaces and their links. When logically combined as an aggregate, each underlying physical interface responds to at least one IP address and to at least one common MAC address. All network entities, such as clients and switches, view the aggregate as a single network interface that provides a high data transfer rate to and from the server. When forwarding client data traffic directed to the server, the switch or client may utilize any of the aggregated physical links to transport that data traffic. Aggregation of physical links into a single virtual interface is well known and described in IEEE Standard 802.3ad.

A typical approach used to assign the common MAC address to the aggregate is to select a MAC address originally assigned to one of the physical interfaces of the aggregate. However, this method of assignment may make it difficult to remove a physical interface from the aggregate and reuse it as an individual network interface. If the MAC address of the interface that is removed from the aggregate is the one selected for assignment to the aggregate, then that "older" MAC address of the aggregate has to be altered to an address of one of the remaining underlying interfaces. This procedure will unsettle the network for some time, possibly creating some problems.

For example, the server may have packets loaded into queues of its interfaces that are ready to be transmitted over the network links. These packets may contain the older MAC address of the aggregate as the source address of each packet. To prevent transmitting incorrect information over the network, these packets must be discarded, which results in retransmission of the packets, delays in responding to requests from clients and inefficient usage of network bandwidth. In addition, some clients may have the older MAC address identified as the address of the aggregate and this may take time to change. This, in turn, results in periods of network inactivity, which is expensive. The present invention is directed to a technique for solving this problem.

SUMMARY OF THE INVENTION

The present invention comprises a technique for implementing a MAC address pool containing a plurality of unique MAC addresses adapted for assignment to a virtual interface or aggregate of a server in a computer network. The MAC address pool is created from original MAC addresses assigned to physical interfaces of a network interface card (NIC) that is used in the server. The physical interfaces and their underlying physical links are organized as the aggregate. Upon system initialization, a virtual interface process of the server collects the originally assigned MAC addresses of the NIC, modifies them and organizes them as a pool. Each modified MAC address is a distinct MAC address that does not conflict with other MAC addresses within, e.g., a local area network of the computer network. That is, the pool of modified MAC addresses is entirely different from the set of MAC addresses originally assigned to the NIC in the server.

According to the invention, the originally assigned MAC addresses are modified by asserting locally administered bits of those addresses. When an aggregate is created for the underlying physical interfaces and links, a modified address is obtained from the pool and used as the MAC address for the aggregate. All underlying physical interfaces and links of the aggregate are configured to receive packets bearing this MAC address. Upon destroying the aggregate, the modified address is returned back to the pool.

Advantageously, any modified address of the MAC address pool may be selected as the MAC address assigned to the aggregate. Removal of an underlying link from the aggregate is performed in a fast and efficient manner without disturbing the operation of the aggregate. That is, all network entities identify a static address with the aggregate, thereby enabling continued smooth flow of traffic to and from the aggregate. Moreover, an interface that is removed from the aggregate can be immediately reassigned its own MAC address without receiving spurious packets, i.e., packets that are destined for the aggregate. The novel modified MAC address pool may be extended for safe implementation in a multiprocessor environment by locking access to the pool.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
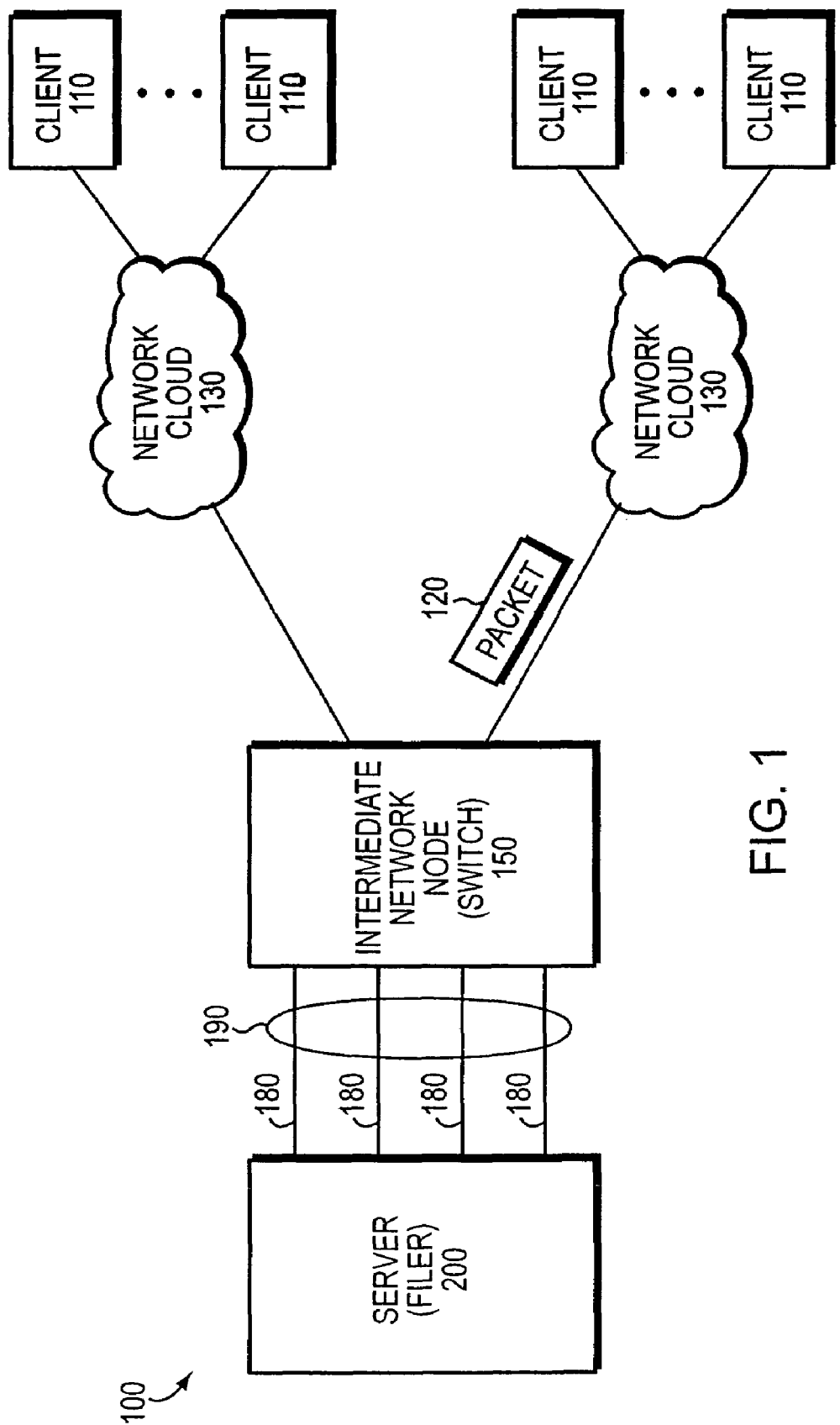
FIG. 1 is a schematic block diagram of a computer network including a plurality of clients and a server that may be advantageously used with the present invention.

FIG. 1 is a schematic block diagram of a computer network 100 including a plurality of clients 110 and a server 200 that may be advantageously used with the present invention. The server is a special-purpose computer preferably configured as a network storage appliance or filer 200 that provides file service relating to the organization of information on storage devices, such as disks. The client 110 may be a general-purpose computer configured to execute applications, including file system protocols. Moreover, the client 110 may interact with the filer 200 in accordance with a client/server model of information delivery. That is, the client may request the services of the filer, and the filer may return the results of the services requested by the client, by exchanging packets 120 over the network 100. It will be understood to those skilled in the art that the inventive technique described herein may apply to any server capable of providing a service to any client in accordance with various applications executing on the client.

The filer 200 is coupled to an intermediate network node, such as a router or switch 150, over a plurality of physical links 180, each of which may comprise, e.g., a gigabit Ethernet link, a 100 base T Ethernet link, a 10 base T Ethernet link or any similar link. The switch 150 is further coupled to the clients 110 over network clouds 130 configured as virtual local area networks (VLANs). Alternatively, the filer may be connected directly to at least one client or to a plurality of intermediate network nodes 150, each of which is coupled to the clients over network clouds 130 configured as local area networks (LANs).

Figure 2:
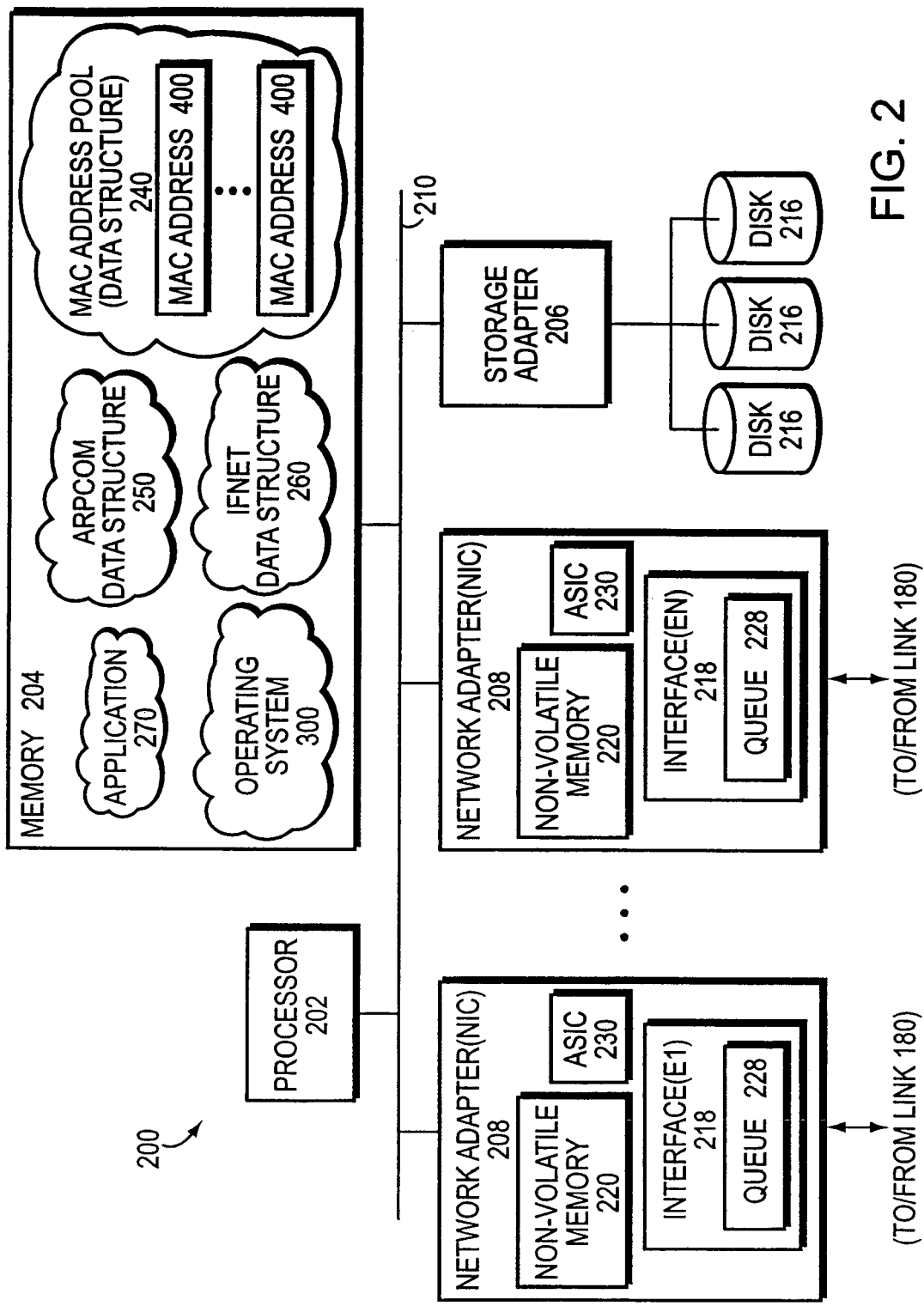
FIG. 2 is a schematic block diagram of a server, such as a network storage appliance or filer that may be advantageously used with the present invention.

FIG. 2 is a schematic block diagram of the filer 200 comprising a processor 202, a memory 204, a storage adapter 206 and at least one network adapter 208 interconnected by a system bus 210, which is preferably a conventional peripheral computer interconnect (PCI) bus 210. The filer also includes an operating system 300 that implements a file system to logically organize the information as a hierarchical structure of directories and files on disks 216 coupled to the storage adapter 206. In the illustrative embodiment described herein, the operating system 300 is preferably the NetApp® Data ONTAP™ operating system available from Network Appliance, Inc. that implements a Write Anywhere File Layout (WAFL) file system.

The memory 204 may be apportioned into various sections, one of which is a pool 240 organized to store modified medium access control (MAC) addresses for use in accordance with the invention. Other sections of the memory may be organized as storage locations that are addressable by the processor and adapters for storing software application program code and other data structures associated with the present invention. The processor and adapters may, in turn, comprise processing elements and/or logic circuitry configured to execute the software code and manipulate the data structures. The operating system 300, portions of which are typically resident in memory and executed by the processing elements, functionally organizes the filer by, inter alia, invoking storage and network operations in support of the services implemented by the filer 200. It will be apparent to those skilled in the art that other processing and memory means, including various computer readable media, may be used for storing and executing program instructions pertaining to the inventive technique described herein.

Figure 3:
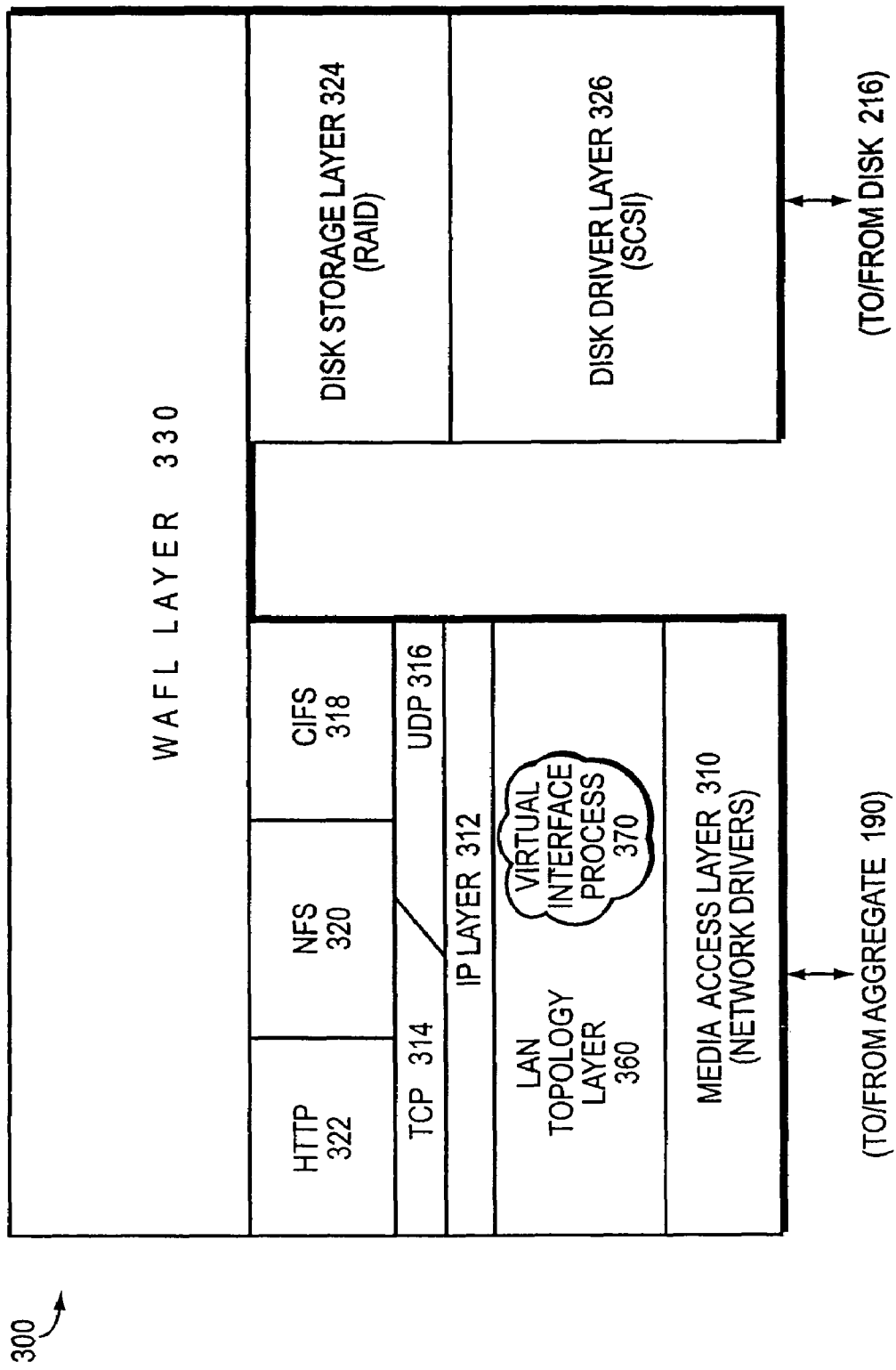
FIG. 3 is a schematic block diagram of an operating system that may be advantageously used with the present invention.

FIG. 3 is a schematic block diagram of the Data ONTAP operating system 300 that may be advantageously used with the present invention. The operating system comprises a series of software layers, including a media access layer 310 of network drivers (e.g., an Ethernet NIC driver). The operating system further includes network protocol layers, such as the IP layer 312 and its supporting transport mechanisms, the Transport Control Protocol (TCP) layer 314 and the User Datagram Protocol (UDP) layer 316. A file system protocol layer includes support for the Common Interface File System (CIFS) protocol 318, the Network File System (NFS) protocol 320 and the Hypertext Transfer Protocol (HTTP) protocol 322. In addition, the operating system 300 includes a disk storage layer 324 that implements a disk storage protocol, such as a Redundant Array of Independent Disks (RAID) protocol, and a disk driver layer 326 that implements a disk access protocol such as, e.g., a Small Computer Systems Interface (SCSI) protocol. Bridging the disk software layers with the network and file system protocol layers is a WAFL file system layer 330 of the operating system.

Referring again to FIGS. 1 and 2, the storage adapter 206 cooperates with the operating system 300 executing on the filer to access information requested by the client, which information may be stored on the disks 216. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 202 (or the adapter 206 itself) prior to being forwarded over the system bus 210 to the network adapter 208, where the information is formatted into a packet 120 and returned to the client 110.

The network adapter 208 may comprise a network interface card (NIC) having the mechanical, electrical and signaling circuitry needed to connect the filer 200 to the switch 150 over the physical links 180, which are preferably organized as a virtual interface or aggregate 190. Each NIC may include a single interface 218 such that, for a 4-link aggregate, the filer includes four NICs 208. Alternatively, each NIC 208 may include 4 "quad port" interfaces 218, each of which is connected to a link 180 of the aggregate 190. Each interface 218 (E1-EN) may be assigned one or more Internet Protocol (IP) addresses along with a media access control (MAC) address (M1-MN).

The MAC address of each interface 218 (along with user configurable parameters) is stored in a programmable area, such as a non-volatile memory 220, of the NIC 208. The originally assigned MAC address is globally unique in that the address is not assigned to another interface of a NIC in the computer network. Each physical interface has an associated programmable device, such as an application specific integrated circuit (ASIC 230), adapted to store the originally assigned MAC address. When a packet 120 is received at the interface 218, a destination MAC address of the packet is compared with the MAC address stored in the ASIC 230. If the addresses do not match, the packet is not accepted at the interface 218.

In addition, each physical interface 218 has a set of associated data structures that contains information describing the interface. An illustrative example of such a data structure set is an arpcom data structure 250 and its "closely tied" ifnet data structure 260 associated with each interface of the filer. These data structures are located in memory 204 of the filer and include, among other things, information describing the type of interface (e.g., Ethernet) and the MAC address of the interface (e.g., M1). The ifnet data structure 260 also includes entry points or function pointers to the NIC driver associated with the interface to enable an application 270 executing on the filer to "call" the interface driver when, e.g., sending data to the particular interface (E1). For example, the ifnet data structure 260 provides an entry point to the interface driver via an ioctl function call. Application 270 executing on the filer can obtain the MAC address of the underlying physical (Ethernet) interface through this entry point. The arpcom and ifnet data structures 250 and 260 may be schematically represented as follows:

```
struct arpcom{
    struct ifnet ifnet;
    mac_address[M1];
    ...
}
struct ifnet{
    type[Ethernet];
    transmit entry point;
    ioctl entry point;
    ...
}
```

Upon initialization ("booting") of the filer, the MAC address originally assigned to the interface 218 is retrieved from the non-volatile memory 220 by a network interface (NIC) driver 310 of the operating system and loaded into the arpcom data structure 250 for that interface. In addition, the driver loads the ASIC 230 with the originally assigned MAC address such that packets received at the interface are only accepted by the filer if their destination addresses match the MAC address loaded into the ASIC. However, the operating system 300 may assign a different MAC address to the interface. In that case, the arpcom data structure 250 and ASIC 230 associated with the interface 218 can be reprogrammed to accept the different MAC address rather than the originally assigned MAC address.

When the physical interfaces 218 and their associated links 180 are aggregated as a single virtual interface 190, all of the physical interfaces respond to only one MAC address. That is, the physical interfaces 218 are organized into one virtual "pipe" having one logical interface that is assigned a common MAC address. All network entities, including switch 150 and clients 110, view the aggregate 190 (and its underlying physical interfaces/links) as having at least one MAC address. When each interface 218 is configured as part of the aggregate, its ASIC 230 is reprogrammed to respond to the newly assigned MAC address of the aggregate. In addition, its arpcom data structure 250 is reconfigured (reloaded) with this newly assigned MAC address. Therefore, the NIC driver 310 uses the newly assigned different MAC address of the interface for comparison operations with incoming packets at the interface 218.

Figure 4:
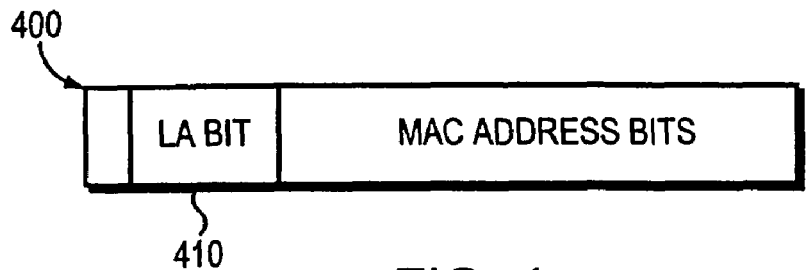
FIG. 4 is a schematic block diagram of a medium access control (MAC) address having a locally administered bit that may be advantageously used with the present invention.

The present invention comprises a technique for implementing a MAC address pool, e.g., a data structure, containing a plurality of unique MAC addresses adapted for assignment to the aggregate. Each MAC address in the pool 240 is created from an original MAC address assigned to a physical interface 218 of the aggregate 190. Specifically, a locally administered bit (e.g., bit 46) of each originally assigned MAC address is modified (asserted) to create a unique MAC address. FIG. 4 is a schematic block diagram of a MAC address 400 having the locally administered (LA) bit 410 that may be advantageously used with the present invention. The state of bit 46 in each MAC address indicates whether the address is locally administered or globally administered. Preferably, assertion (e.g., "1") of the locally administered bit 410 creates a locally administered address that is also a unique, modified MAC address 400 in accordance with the invention. Each modified MAC address 400 is a distinct MAC address that does not conflict with other MAC addresses within, e.g., a LAN of the network 100. As a result, the pool 240 of modified MAC addresses 400 is entirely different from the set of MAC addresses originally assigned to the NIC 208. The mac_pool data structure may be illustratively defined as follows:

```
typedef struct {
    int if_status[MAX_INTERFACES];
    char *if_mac[MAX_INTEFACES];
}mac_pool;
``` wherein the content of the "if_status" field is used to indicate whether the corresponding modified MAC address is in use, and the content of the "if_mac" field is used to store the modified MAC addresses.

Figure 5:
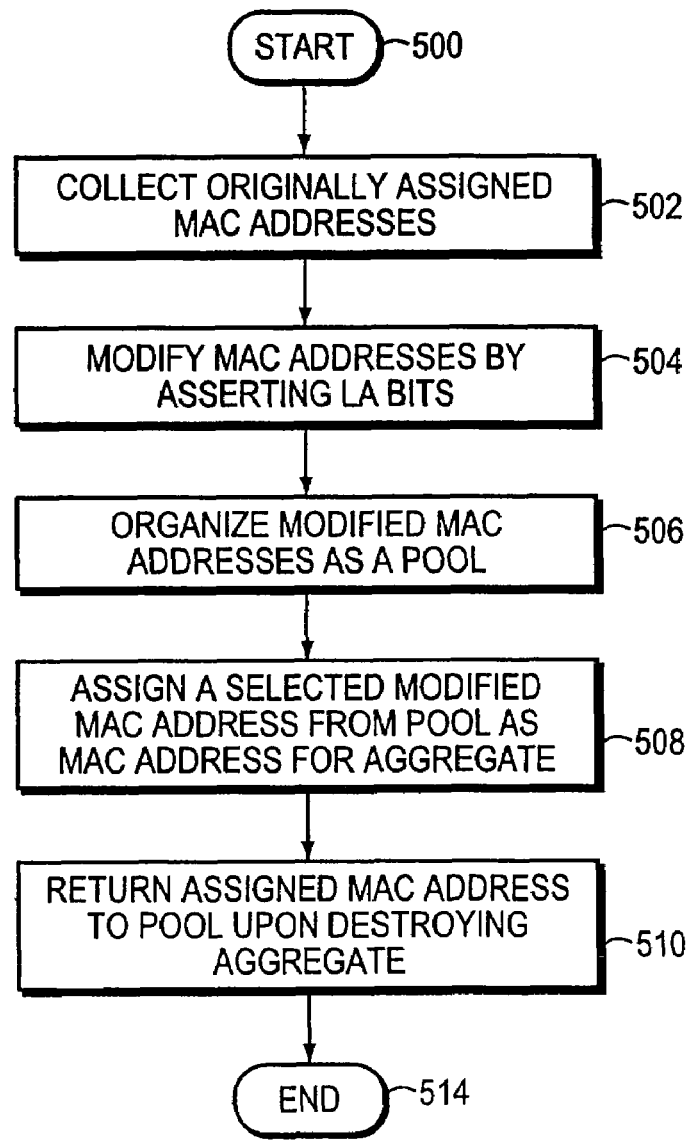
FIG. 5 is a flowchart illustrating the sequence of steps comprising a MAC address pool technique in accordance with the present invention.

FIG. 5 is a flowchart illustrating the sequence of steps comprising the MAC address pool technique in accordance with the present invention. The sequence starts at Step 500 and proceeds to Step 502 where, upon initialization (booting) of the filer, a virtual interface process 370 collects the MAC addresses originally assigned to the physical interfaces of the NIC from, e.g., the arpcom data structures 250 associated with the interfaces. In Step 504, the virtual interface process modifies those addresses by asserting the LA bit 410 (e.g., bit 46) in each address. The virtual interface process 370 preferably executes within a LAN topology layer 360 of the operating system 300. In Step 506, the virtual interface process organizes the modified MAC addresses as the pool 240 of unique MAC addresses 400 for the aggregate 190. In Step 508, the process 370 selects one of the modified MAC addresses from the pool and assigns it as the MAC address for the aggregate (e.g., for each underling physical interface of the aggregate). To that end, the virtual interface process 370 loads the ASIC 230 and arpcom data structure 250 associated with each interface with the newly assigned modified MAC address 400. Upon destroying the aggregate, the virtual interface process returns the modified MAC address assigned to the aggregate to the pool 240 (Step 510). The sequence then ends in Step 514.

Further to the illustrative embodiment, the inventive technique is implemented as set of three software functions. Once all physical interfaces of the aggregate are identified and their originally assigned MAC addresses are modified by the virtual interface process 370, the first software function executes to obtain these modified MAC addresses and store them in the ifnet data structure 260. The remaining two software functions are implemented to obtain or return a modified MAC address 400 from the pool 240, i.e., the mac_pool data structure 240. The following is an illustrative pseudo code representation of the three software functions:

```
Function1 ( ){
    For (all ifnet structures)
        Get MAC address
        Set locally administered bit
        Save the address into mac_pool
        Reset corresponding "if_status" bit
}
Function2 ( ){
    For (each address in mac_pool)
        If "if_status" is not set, set it and return this address
}
Function3 ( ){
    Reset the corresponding "if_status" bit
}
```

According to the present invention, the LA bit 410 (bit 46) of each MAC address (obtained through the ioctl command) is asserted and each modified address 400 is stored in the mac_pool data structure 240. This process results in array of distinct modified MAC addresses. When a new aggregate is created, an address is selected from the array, the if_status field (bit) of the ifnet data structure 260 is asserted to indicate that the address is being used and the address is assigned to the aggregate. When the aggregate is destroyed, the assigned address is returned to the array by resetting the if_status bit.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for implementing an address pool, comprising:
   collecting at least one address, the at least one address originally assigned as a unique address to at least one physical interface of a computer;
   modifying said each originally assigned address to be a plurality of modified addresses;
   organizing the plurality of modified addresses as the address pool; and
   assigning a selected modified address from the pool as a unique address for the pool, the selected modified address to use in contacting the computer in response to receiving a message addressed to an address of the pool.

2. The method of claim 1, further comprising:
   asserting at least one locally administered bit to make the address originally assigned as a unique address a plurality of modified addresses.

3. The method of claim 1, further comprising:
   asserting a plurality of locally administered bits to make the address originally assigned as a unique address a plurality of modified addresses.

4. The method of claim 1, further comprising:
   using the computer as a server.

5. The method of claim 1, further comprising:
   using as the at least one address a 48 bit medium access control (MAC) address.

6. The method of claim 1, further comprising:
   assigning an address of a network interface card as the unique address.

7. The method of claim 1, further comprising:
   obtaining a plurality of MAC addresses assigned to a network adapter of the computer;
   modifying at least one address of the plurality of MAC addresses to form a modified MAC address; and
   assigning the modified MAC address for communication with the computer.

8. The method of claim 1, further comprising:
   modifying the originally assigned address by asserting a predetermined bit of the address.

9. The method of claim 1, further comprising:
   loading an application specific integrated circuit with the selected modified address; and
   identifying a packet received by the computer by comparing an address carried in the packet with the selected modified address using the application specific integrated circuit.

10. A computer apparatus having a network adapter, the network adapter having an address, comprising:
    a processor coupled to the network adapter;
        an operating system executable by the processor, the operating system having a virtual interface process configured to collect addresses originally assigned to the network adapter, the virtual interface process modifying each originally assigned address by asserting a predetermined bit of the address to form a pool of modified addresses, and the virtual interface process to assign a selected modified address from the pool as a modified address for the computer.

11. The apparatus of claim 10, further comprising:
    the address is a medium access control (MAC) addresses; and
    the predetermined bit is bit 46 of the MAC address.

12. The apparatus of claim 11, further comprising:
    means for returning the selected modified address to the pool.

13. A computer apparatus having a network adapter, the network adapter having at least one address, comprising:
    means for collecting the least one address, the at least one address originally assigned as a unique address to at least one physical interface of the computer;
    means for modifying said each originally assigned address to be a plurality of modified addresses;
    means for organizing the plurality of modified addresses as an address pool; and
    means for assigning a selected modified address from the pool as a unique address for the pool, the selected modified address to use in contacting the computer in response to receiving a message addressed to an address of the pool.

14. The apparatus as in claim 13, comprising:
    means for asserting at least one locally administered bit to make the address originally assigned as a unique address a plurality of modified addresses.

15. The apparatus as in claim 13, comprising:
    means for asserting a plurality of locally administered bits to make the address originally assigned as a unique address a plurality of modified addresses.

16. The apparatus as in claim 13, comprising:
    means for using the computer as a server.

17. The apparatus as in claim 13, comprising:
    means for using as the at least one address a 48 bit medium access control (MAC) address.

18. The apparatus as in claim 13, comprising:
    means for assigning an address of a network interface card as the unique address.

19. The apparatus as in claim 13, comprising:
means for obtaining a plurality of MAC addresses assigned to a network adapter of the computer;
means for modifying at least one address of the plurality of MAC addresses to form a modified MAC address; and
means for assigning the modified MAC address for communication with the computer.

20. The apparatus as in claim 13, comprising:
means for modifying the originally assigned address by asserting a predetermined bit of the address.

21. The apparatus as in claim 13, comprising:
means for loading an application specific integrated circuit with the selected modified address; and
means for identifying a packet received by the computer by comparing an address carried in the packet with the selected modified address using the application specific integrated circuit.

22. A computer readable media, comprising:
said computer readable media containing instructions for execution on a processor for the practice of a method for implementing an address pool, the method having the steps of,
collecting at least one address, the at least one address originally assigned as a unique address to at least one physical interface of a computer;
modifying said each originally assigned address to be a plurality of modified addresses;
organizing the plurality of modified address pool; and
assigning a selected modified address from the pool as a unique address for the pool, the selected modified address to use in contacting the computer in response to receiving a message addressed to an address of the pool.

* * * * *

UNITED STATES PATENT AND TRADEMARK OFFICE
CERTIFICATE OF CORRECTION

PATENT NO. : 7,444,405 B2 Page 1 of 1
APPLICATION NO. : 11/085504
DATED : October 28, 2008
INVENTOR(S) : SushilKumar Gangadharan It is certified that error appears in the above-identified patent and that said Letters Patent is hereby corrected as shown below:

In the Claims:

Col. 10, Line 11, Claim 22, please amend as shown:

organizing the plurality of modified <u>addresses as an</u> address pool; and

Signed and Sealed this

Fifth Day of October, 2010

David J. Kappos
*Director of the United States Patent and Trademark Office*